US012537872B1

(12) United States Patent
Landgrebe et al.

(10) Patent No.: US 12,537,872 B1
(45) Date of Patent: Jan. 27, 2026

(54) BLOCKCHAIN DATA SYNCHRONIZATION AND SERVICE

(71) Applicant: Coinbase, Inc., Oakland, CA (US)

(72) Inventors: Mark Landgrebe, Marina Del Rey, CA (US); Nicholas Hovsmith, New York City, NY (US); Parth Shah, San Francisco, CA (US); Jeffrey Gilbert, Downers Grove, IL (US)

( * ) Notice: Subject to any disclaimer, the term of this patent is extended or adjusted under 35 U.S.C. 154(b) by 0 days.

(21) Appl. No.: 18/782,643

(22) Filed: Jul. 24, 2024

(51) Int. Cl.
*H04L 67/1097* (2022.01)
*H04L 45/0377* (2022.01)
*H04L 67/02* (2022.01)

(52) U.S. Cl.
CPC ...... *H04L 67/1097* (2013.01); *H04L 45/0377* (2022.05); *H04L 67/02* (2013.01)

(58) Field of Classification Search
None
See application file for complete search history.

(56) References Cited

U.S. PATENT DOCUMENTS

| | | | |
|---|---|---|---|
| 11,194,791 B1 * | 12/2021 | Baine | G06F 9/54 |
| 2019/0236606 A1 * | 8/2019 | Padmanabhan | H04L 9/3239 |
| 2020/0242595 A1 * | 7/2020 | Harrison | H04L 67/1097 |

OTHER PUBLICATIONS

Luo et al., "The Dynamic Routing Load Balancing Algorithm Based on Blockchain Platform", Mar. 16, 2024, IEEE, 2024 9th International Conference on Big Data Analytics (ICBDA) (2024, pp. 174-179) (Year: 2024).*

* cited by examiner

*Primary Examiner* — Davoud A Zand
(74) *Attorney, Agent, or Firm* — Holland & Hart LLP

(57) ABSTRACT

Methods, systems, and devices for data management are described. A custodial token platform may (e.g., via a data synchronizer or a server) route requests received from one or more client applications to one or more compute clusters that execute a set of blockchain nodes for supporting the blockchain network. The platform may assign cookies to the client applications such that subsequent requests from a same client application are routed to the correct compute cluster such as to avoid or limit data synchronization errors. The initial routing may be based on one or more routing factors. The custodial token platform may additionally support an external node validator which validates and caches data from multiple external blockchain data service providers, and the cached data may be used to service blockchain data requests. An inline data validation procedure may be performed if a request results in a cache miss.

20 Claims, 10 Drawing Sheets

BLOCKCHAIN DATA SYNCHRONIZATION AND SERVICE

FIELD OF TECHNOLOGY

The present disclosure relates generally to data management, including techniques for blockchain data synchronization and service.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Figure 1:
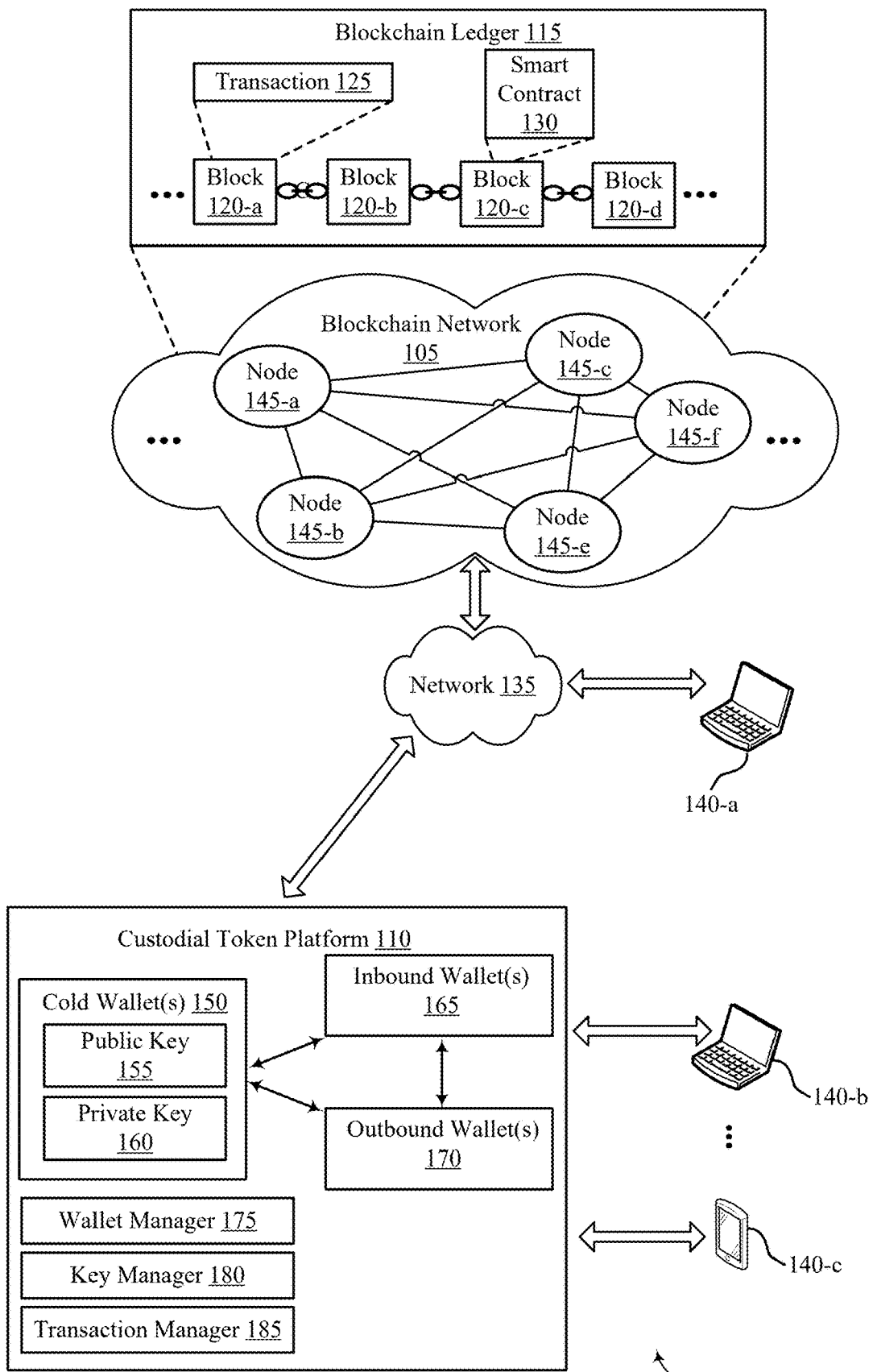
FIG. 1 illustrates an example of a computing environment that supports blockchain data synchronization and service in accordance with aspects of the present disclosure.

A blockchain service provider, such as a custodial token platform, may host or manage multiple blockchain nodes that support a corresponding blockchain network and facilitate services supported by the blockchain service provider, such as wallet services, transfer services, and the like. The blockchain nodes may communicate with each other (and other external blockchain nodes) to broadcast to the network and to acquire a consensus to validate new blocks, for example, to facilitate the validation of transactions to maintain a secure and decentralized network. In some cases, however, two or more blockchain nodes of the blockchain service may have inconsistent data at any point in time. For example, a first blockchain node may have validated blocks at a height x, while a second blockchain node may have validated blocks at a height x−1. In such cases, when a service supported by the blockchain service provider is requesting access to blockchain data via the blockchain nodes supported by the blockchain service provider, the service may receive inconsistent data (e.g., via data serviced by the two different blockchain nodes), which may result in errors, blocked transactions, and the like.

To address these and related issues, the blockchain service provider may implement a set of worker nodes in front of the set of compute clusters that support the blockchain nodes. The set of worker nodes may perform various processes such as request routing and backend blockchain node management. For example, the set of worker nodes may configure a first set of blockchain nodes (at a first compute cluster) as active (to receive and process requests) and a second set of blockchain nodes (at a second compute cluster as passive). The passive nodes may still interact with the blockchain network but may not process internal requests from services. The worker nodes also facilitate activating and/or deactivating blockchain nodes, for example, based on requests traffic. The techniques described herein may enable routing requests to active worker nodes and reducing unnecessary resources otherwise associated with failover worker nodes or inactive/passive worker nodes. These routing and activation techniques may also support service of consistent blockchain data to avoid or limit data inconsistency issues between multiple blockchain nodes.

For example, a computing system (e.g., one or more servers of a custodial token platform) that hosts multiple worker nodes may receive, from a first client application, a first request to interact with a blockchain network. The computing system may be configured to interact with multiple compute clusters, and each of the compute clusters may execute a set of blockchain nodes for supporting the blockchain network. The custodial token platform may assign to the first client application in response to receiving the first request, a cookie (e.g., data payload). The custodial token platform may route, using a worker node of the multiple worker nodes and based on one or more routing factors, the first request to a first compute cluster of the multiple compute clusters, where the routed first request includes the assigned cookie. The custodial token platform may receive, from the first client application, a second request to interact with the blockchain network. The custodial token platform may route, based on the cookie assigned to the first client application, the second request to the first compute cluster, where the first compute cluster routes the second request to a blockchain node executed by the first compute cluster in accordance with the cookie assigned to the first client application. Thus, the cookie may facilitate assignment of a request coming from the same application (e.g., a wallet service) to the same blockchain nodes, which may avoid data inconsistency problems.

The computing system may additionally or alternatively implement an external data service that obtains blockchain data from one or more external blockchain data providers to service internal service requests. The external data service may maintain a cache of block data associated with the blockchain network and received from the external blockchain data providers. The cache may be used to store blocks at the same height that are inconsistent with each other, and blocks may be discarded from the cache based on a block height threshold and/or based on validation of block data for a canonical chain. Additionally, the external data service may use one or more tables to monitor whether cached blocks are associated with a canonical or longest chain. The cache may be used to service internal requests while the canonical chain is being determined. Moreover, the external data service may validate data from multiple external data service providers, such that the data is deemed safe to consume by internal services. These and other techniques are described in further detail with respect to the figures.

FIG. 1 illustrates an example of a computing environment 100 that supports blockchain data synchronization and service in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 140-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital assets between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to an external wallet, to deploy a smart contract (e.g., a self-executing program), or to call a smart contract.

Additionally, the custodial token platform 110 may implement or support various services to access data from the blockchain ledger 115. In some cases, the custodial token platform 110 may implement one or more internal blockchain nodes that interact with the blockchain network 105 and are used to service data to internal services or applications (e.g., wallet service, transaction service). To facilitate blockchain data consistency, the custodial token platform 110 may include a computing system that hosts multiple worker nodes (e.g., blockchain nodes), which are nodes that route requests to backend computing clusters that host blockchain nodes. The routing may be performed such as to limit or avoid data inconsistency issues as well as to balance loads between nodes based on routing factors (e.g., number of errors, assigned weight, whether a cluster is currently active/passive).

For example, the custodial token platform 110 may address these difficulties by supporting data management and synchronization. For example, using the techniques discussed herein, the computing clusters supporting the blockchain nodes may be monitored such that processing requests are routed to healthy clusters. The techniques described herein may also facilitate activating and/or deactivating computing clusters, for example, based on requests traffic. The techniques described herein may enable efficiently routing requests to active compute clusters and reducing unnecessary power consumption otherwise associated with failover clusters or unused worker clusters.

For example, a computing system of the custodial token platform 110 may receive, from a first client application (e.g., a wallet service), a first request to interact with a blockchain network 105. The computing system may interact with multiple compute clusters, and each of the compute clusters may execute a set of blockchain nodes for supporting the blockchain network. The custodial token platform 110 may assign to the first client application in response to receiving the first request, a cookie (e.g., data payload). The custodial token platform 110 may route, using a worker node of the multiple worker nodes and based on one or more routing factors, the first request to a first compute cluster of the multiple compute clusters, where the routed first request includes the assigned cookie. The custodial token platform 110 may receive, from the first client application, a second request to interact with the blockchain network 105. The custodial token platform 110 may route, based on the cookie assigned to the first client application, the second request to the first compute cluster, where the first compute cluster routes the second request to a blockchain node executed by the first compute cluster in accordance with the cookie assigned to the first client application.

The custodial token platform 110 may also implement or support an external data service that obtains blockchain data from one or more external blockchain data providers to service internal service requests (e.g., from a wallet service). The external data service may maintain a cache of block data associated with the blockchain network and received from the external blockchain data providers. The cache may be used to store blocks at the same height that are inconsistent with each other, and blocks may be discarded from the cache based on a block height threshold and/or based on validation of block data for a canonical chain. Additionally, the external data service may use one or more tables to monitor whether cached blocks are associated with a canonical or longest chain. The cache may be used to service internal requests while the canonical chain is being determined.

Figure 2:
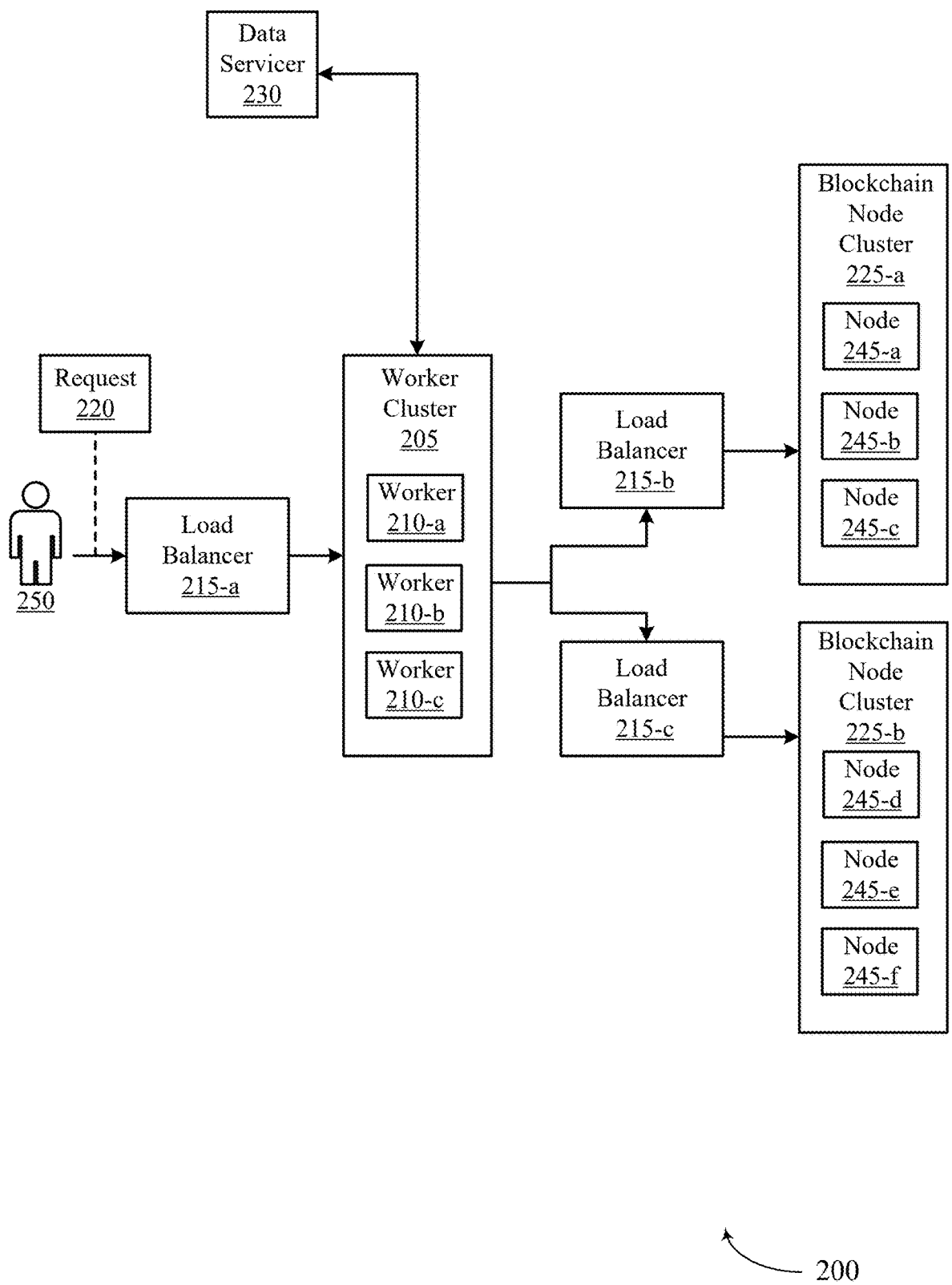
FIG. 2 shows an example of a process flow that supports blockchain data synchronization and service in accordance with aspects of the present disclosure.

FIG. 2 shows an example of a computing architecture 200 that supports blockchain data synchronization and service in accordance with aspects of the present disclosure. For example, the techniques described with respect to the computing architecture 200 may facilitate automatic internal node cluster failover, extended downtime or maintenance of a single internal cluster, enhanced node observability, seamless migrations and node cluster replacements, and rerouting or reconfiguring traffic. Generally, the computing architecture 200 may include a client 250, load balancers 215, a worker cluster 205 including multiple worker nodes 210, a data servicer 230, and blockchain node clusters 225 (e.g., computing clusters) that include multiple blockchain nodes 245. The blockchain nodes 245 may be examples of the blockchain nodes 145 of FIG. 1. Additionally various aspects of the computing architecture may be implemented by a blockchain service provider, such as a custodial token platform 110 as described with respect to FIG. 1.

The client 250, which may be an example of a client application (e.g., wallet application, transaction service) supported by the blockchain service provider, may transmit a first request 220 to the computing system (e.g., including the load balancers 215, the worker cluster 205, and the blockchain node clusters 225). The request may be for blockchain data, such as transaction data, balance data (e.g., crypto token balances associated with one or more blockchain addresses) or a request to write/broadcast a transaction. A first load balancer 215-a of the computing system may send the request 220 to the worker cluster 205. More specifically, one or more of the worker nodes 210 of the worker cluster 205, including worker node 210-a, worker node 210-b, and/or worker node 210-c, may process the request 220. The worker node 210 that processes the request 220 may route the request and assign a cookie to the request to facilitate routing subsequent requests from the same client 250 to the same blockchain node cluster 225 to avoid and/or limit data synchronization or consistency issues. The cookie may be an example of a data payload that includes information such as a client identifier, blockchain node cluster identifier, etc. Thus, the cookie may correspond to a mapping between the client 250 and the respective blockchain node cluster 225.

The data servicer 230 may perform various data-related services, such as monitoring or assisting in routing the request 220 to a healthy blockchain node cluster 225 and/or a healthy node 245. The data servicer 230 may also provide services for various blockchains without a change in code (e.g., for a particular blockchain). For example, the data servicer 230 may receive generic requests for blockchain data for various blockchain networks but may facilitate reformatting or routing requests to a blockchain node cluster 225 supporting the blockchain network for which the request is targeted. The data servicer 230 may also support the request 220 and other requests having various formats, such as Rosetta, JavaScript Object Notation (JSON) Remote Procedure Call (RPC) (JSON-RPC), Batch JSON-RPC, Representational State Transfer (REST), zeroMQ (ZMQ), transmission control protocol (TCP), WebSocket, and gRPC. Based on the monitoring by the data servicer 230, the request 220 and additional requests may be assigned to clusters, such as cluster 225-a and/or 225-b.

Requests (e.g., request 220 and/or additional requests from the same or other client applications) may be routed to one of the blockchain node clusters by the corresponding worker node on a health weighted routing, a static weighted routing, and/or an active or passive routing. The routing techniques may be useful for example, when the cookie is mapped to an unhealthy blockchain node cluster 225. The computing system may deactivate the unhealthy cluster 205 and activate a healthy cluster 205, and the request 220 and subsequent requests associated may be efficiently routed to the activated healthy cluster 205.

For a health weight routing, the worker nodes 210 may forward requests based on a configured list of backend hosts with weights. Error rates may be tracked for each of the backends (e.g., the blockchain node clusters 225), and traffic may be diverted away from unhealthy backend hosts. For example, if cluster 225-a is unhealthy, such that error rates associated with cluster 205 are above an error threshold, then requests may be routed to cluster 225-b (e.g., that is healthy and has an error rate below the threshold). Thus, the worker nodes 210 may monitor and/or access (e.g., via the data servicer 230) health data of the blockchain node clusters 225 to route requests.

For static weighted routing, requests may be routed based on a configured list of backend hosts (e.g., blockchain node clusters 225) in accordance with weights. In some examples, routing based on weights may be without considering the health of the backend hosts. That is, weights may be assigned to each blockchain node cluster 225 such that a percentage of requests are routed based on the weights. In such cases, higher weighted blockchain node clusters 225 may receive more requests than lower weighted blockchain node clusters 225. For active or passive routing, a backend host, such as blockchain node cluster 225-*a* may be configured as active and other clusters, such as blockchain node cluster 225-*b* may be configured as passive or inactive. Traffic may be routed to the active backend, and cookies may be assigned to an initial request and the worker nodes 210 may pass along cookies to the active backends. The data servicer 230 may monitor the error rate of the active backend cluster, such as the cluster 225-*a*, and if the error rate exceeds an error threshold, one of the passive backend hosts may be activated, such as cluster 225-*b*. Subsequent traffic may be routed to the new active backend. In this manner, the sticky sessions may be seamlessly completed at the new backend without processing interruption due to otherwise being mapped to an inactive backend.

As described herein, the worker nodes 210 may assign cookies to requests such as to map applications to a particular backend host (e.g., a blockchain node cluster 225). The cookies may be assigned such as to cause a sticky session to avoid or limit data inconsistency errors. A sticky session, also referred to as session affinity, is a method used in load balancing to help maintain consistency in the experience of a client (e.g., client 250) interacting with the blockchain data service supported by the computing system of FIG. 2. A sticky session cookie is a type of cookie that is related to this concept. When the client first accesses the blockchain data service (e.g., of FIG. 2) that is part of or includes a load-balanced set of servers, the load balancer assigns the user's session to a specific server. Then, the load balancer associates the cookie to the client. This cookie includes data that identifies the server to which the client session has been linked. A sticky session cookie may be used to ensure that all subsequent requests from the client 250 during that session are directed to the same server to which the client was initially assigned. By using a sticky session cookie, the load balancer may route requests that are part of the same session to the same backend cluster. Accordingly, after an initial request from a particular client (e.g., the client 250) is assigned a cookie, subsequent requests (at least for some duration) are routed to the same backend cluster (e.g., set of servers).

An orchestrator of the worker cluster 205 may maintain an in-memory map of the current block heights for all healthy nodes and a current watermark based on this data. The map may be safeguarded with a synchronization Mutex to prevent conflicts between multiple routines updating the map simultaneously. The watermark is determined so that a specific percentage of nodes in the cluster have at least that block height. This percentage may be established through experiments and aimed to continuously increase block height while minimizing the impact on freshness and availability of data. If a node fails to deliver a health check response to an orchestrator for a set period, such as a minute, the orchestrator may remove it from the map and accordingly adjust the watermark. The orchestrator deals with read requests with watermarks in a multifaceted approach. When a read request incorporating the "latest" block height is sent, the worker node 210 may substitute the read request with the current block height watermark. It then routes the request randomly to any node within the cluster that has achieved that block height or beyond. If a read request comes in specifying the "earliest" block height, the worker node can assign this request to any node, given that "earliest" refers to the genesis or inaugural block.

In contrast, when dealing with read requests that present a range of blocks, several scenarios come into play. If the end block of the range is at or does not exceed the watermark, the worker node distributes the request to any node that matches or surpasses the end block and consequently relays the results. However, if the start block surpasses the watermark, there's no necessity to distribute the request; instead, an error message is returned, or an empty result is generated. If the block range spans from below to above the watermark, the response may result in an error if the end block is exceedingly high. Alternatively, if the API typically returns results for the blocks in possession, the worker node cluster 205 is expected to replace the end block with the prevailing block height watermark. Following this, it forwards the request to any node at or above this watermark and the results are subsequently returned.

Figure 3:
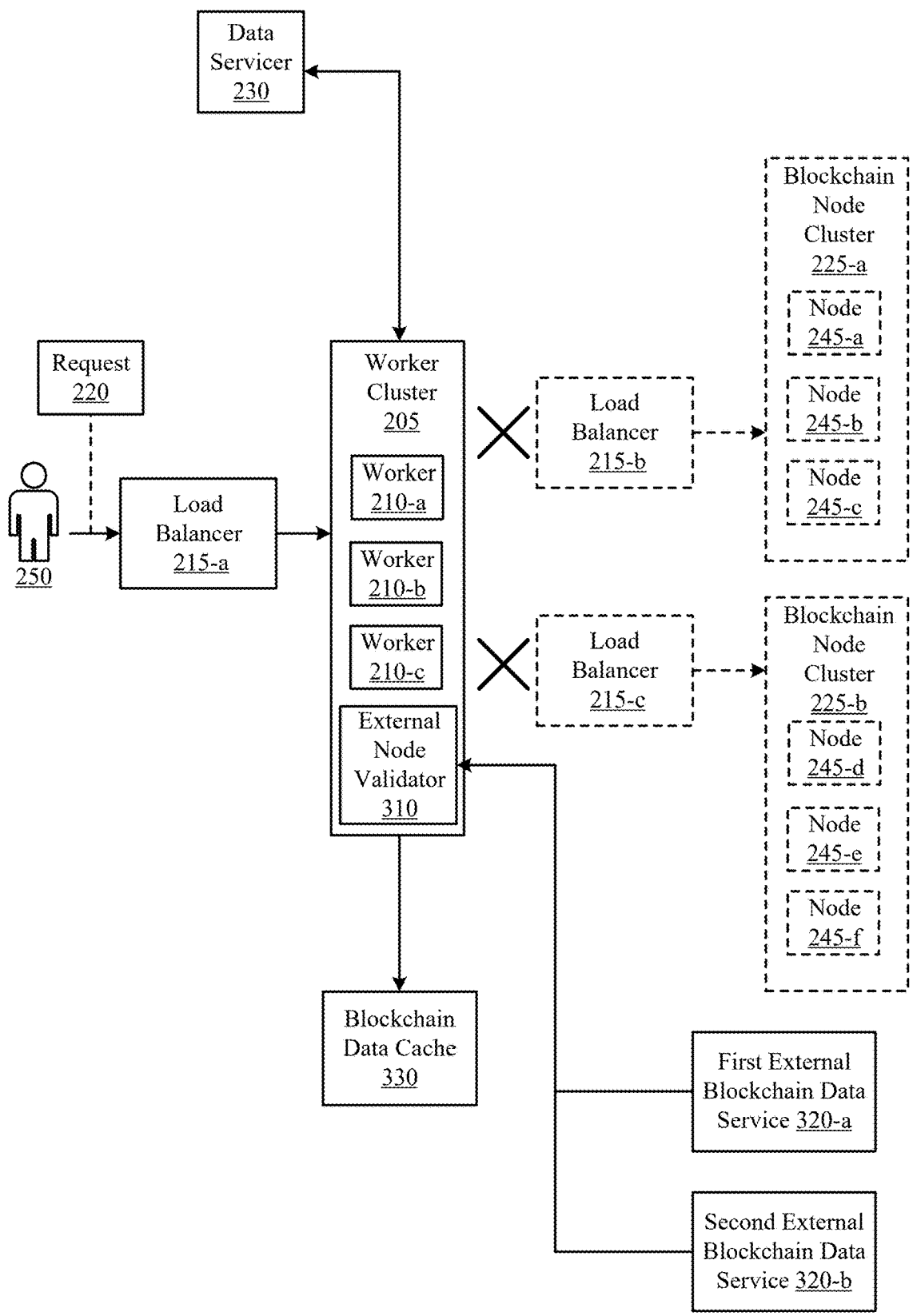
FIG. 3 shows an example of a process flow that supports blockchain data synchronization and service in accordance with aspects of the present disclosure.

FIG. 3 shows an example of a computing architecture 300 that supports blockchain data synchronization and service in accordance with aspects of the present disclosure. The computing architecture 300 may include aspects of the computing architecture 200. For example, the worker cluster 205 and load balancers 215 may implement request routing, monitoring, etc. as described with respect to FIG. 2. However, the computing architecture 300 may include components for obtaining/verifying external blockchain data, such as external node validator 310 a blockchain data cache 330, a first external blockchain data service 320-*a*, a second external blockchain data service 320-*b*. The external node validator 310, the blockchain data cache 330 and the external blockchain data services 320 may provide a failover data service in the case of aspects of the internal nodes having errors, are offline, or are otherwise unable to support providing blockchain data. As illustrated in FIG. 2, the blockchain node clusters 225-*a* and 225-*b* are unable to service requests from the client 250. As such, the external node validator 310 may service such requests and service data obtained from the first and/or second external blockchain data services 320. The external node validator 310 may be supported by the worker cluster 205 or an associated computing system or component as described with respect to FIG. 2. In some examples, the external node validator 310 is an example of a worker node 210 as described with respect to FIG. 2.

For example, the external node validator 310 may obtain protocol-specific (e.g., blockchain specific) structs which are unmarshalled into responses (e.g., to client requests). Additionally, the external node validator 310 may validate data obtained from the two external providers. The external node validator 310 may use a list of native APIs to fetch responses from external providers to validate and cache blockchain data. In some examples, the external node validator 310 supports multiple request formats of various clients (e.g., blockchain services) that are requesting interaction with the blockchain network (e.g., obtaining data or generating write or transaction requests). Requests may be grouped into two buckets for all assets including requests that require validated responses and requests that do not require validated responses. If the requests are for recent data, then the associated responses may be served directly from the cache of validated data. If the requests are for old data, then the requests may be proxied to both external providers and validated inline. Requests that do not require validated responses may be proxied directly to the primary external provider and the response may be returned. In some examples, when the external node validator 310 is active, requests may be routed to internal node clusters (e.g., the blockchain node clusters 225) unless the clusters all become unhealthy, at which point the computing system may automatically switch to serving data from external providers via the external node validator 310.

The external blockchain data services 320 may be examples of services accessible via APIs and that obtain and service blockchain data, such as transaction data. The external node validator 310 may utilize the blockchain data cache 330 to support validation and service of external node data obtained from multiple external data sources (e.g., the external blockchain data services 320).

The external node validator 310 supports various request formats. As noted above, these requests may fall into one of two categories: those that are configured for validation and those that are not. Validated responses are sourced either directly from a cache of previously validated responses (e.g., the blockchain data cache 330), for recent data, or are validated inline for older data. In some examples, non-validated requests are routed directly to the primary external provider. The external node validator 310 may operate a block listener, which searches for new blocks. When a new block is discovered, a correctness check is scheduled. The status of the previously validated block (e.g., previousLatestBlockValidated) is kept in the external node validator 310 and can also be fetched if the external node validator 310 restarts or redeploys. The correctness check operates on a block range from the previousLatestBlockValidated+1 to a latest block height (e.g., latestBlockHeight). In some cases, the block listener may not wait for the correctness check of a particular block to be completed while listening for new blocks. Moreover, the correctness check may function asynchronously while the block listener listens for new blocks. If the previousLatestBlockValidated remains constant for too long (e.g., longer than a threshold), an alert is raised, as it could indicate issues with the third-party providers, which may require action. The problem can be resolved by changing the third-party provider URLs in a configuration, which may activate within 20 seconds. After validating a response, the response may be stored in a first table of the cache. A second table may also be updated to map latestBlockHeight+1 to the block hash, indicating that this is the primary block at that height in the cache, which may be used to serve all requests containing only a block number. Additionally, responses may be added to the second table when the responses are actively in the canonical chain of the cache (e.g., the primary block).

The blockchain data cache may support various benefits, such as security and compliance, cost efficiency, low latency, and extensibility. For security and compliance, merely validating the data once or multiple times (as may be performed) may be insufficient, since later proxying could lead to receiving malicious or incorrect data and can cause services to process harmful responses. Thus, validating and caching the data may result in the data being correct. For cost efficiency, by caching responses, the number of calls to third-party providers may be reduced, resulting in additional cost savings. The cache may offer lower latency for downstream services when fetching blocks, transactions, receipts, and traces, being an in-memory cache. This caching techniques may be faster than other databases, database implementations, and other blockchain nodes. As described herein, the cache implements techniques for blockchain network reorganization. Further, the cache may handle data from the internal nodes (e.g., the blockchain node clusters 225). This technique supports a latency reduction for downstream services and the number of calls to our internal nodes. such as data service, validation, and consistency.

The external node validator 310 may oversee maintaining the cache size within a fixed limit (e.g., the block height threshold). When a new block is added and the cache reaches its maximum configured size (e.g., the block height threshold), responses for the oldest block height may be deleted before writing the new block responses. This maximum cache size represents the highest number of block heights for which responses are retained. The external node validator 310 might have discovered and stored responses for multiple blocks at each height. In case the most recent block's value exceeds the difference between the current cache content and the cache's maximum configured size, the external node validator 310 may flush all cache content before writing the new block. This technique results in reduced overhead (e.g., cost and computing resource). More particularly, the cache size may be fixed and small, but older data may be served via inline validation.

For example, when requests for block data result in a cache miss (e.g., the requested data is not stored in the cache), the data may be obtained from the external service and an inline validation may be performed. That is, when a request is received from the client 250 and the requested data is not stored in the blockchain data cache (e.g., cache miss), then the inline validation procedure is executed. The inline validation may include the external node validator 310 requesting and receiving the requested data from both external blockchain data services 320. The response from the first external data service 320-*a* may be parsed to generate a first struct, and the response from the second external data service 320-*b* may be parsed to generate a second struct. The first and second structs may be compared such as to validate the data. If the data is validated via the struct comparison, then the data may be returned to the client 250 as a response to the initial client request.

As described herein, the blockchain data cache 330 may implement various techniques to handle blockchain reorganizations. A blockchain reorganization, often referred to as a "reorg," is an event in which one group of transactions is replaced by another group of transactions in a blockchain network. Reorgs can occur naturally when two miners discover a block at nearly the same time, leading to two competing chains in the network. The network follows the longest chain rule, so when a miner finds the next block on one of these chains, that becomes the official chain of the network ("canonical chain"), and the other chain is discarded, causing a reorg. This is often called a "chain split" and is usually resolved quickly.

The blockchain data cache 330 may implement one or more tables that are used when new blocks are added and in conjunction with reorgs. For example, when a new block is added to the cache from the block listener, several processes are set into motion. If the new block is notably ahead or behind the cache's height, the cache is flushed and reinitialized. However, if that's not the case, the new block is added to both the first table and the second table. The entries of the oldest block height are then deleted, and the cache height is updated accordingly. Moreover, a routine is triggered to manage potential reorganizations. This routine recursively traverses through the new block's lineage until it finds a 'parent' that is designated as a primary in the second table, indicating the parent part of the longest canonical chain. If any blocks are found to be missing during this traversal, they are requested from the validator by their hashes, validated, and subsequently added to the first table. Upon locating a common primary ancestor block, a lock on the system is initiated and a safety check is performed. This safety check determines if the new block is still considered a primary (part of the canonical chain) in the second table. If it is, all ancestors sandwiched between the new block and the primary ancestor are marked as primary. This step may support ensuring the synchronization of concurrent reorganization handling routines. If the new block is not a primary, the system refrains from taking any action. The procedure concludes by releasing the previously initiated system lock.

The current cache size is maintained by the validator. When a new block at height i is added to the cache, the validator removes entries at the height i−2n, where n is the number of blocks required for confirmation. Both n and the constant 2 may be configured in the cache package. A standard minimum cache size i−2n may be a standard cache size, but it should be understood that the cache size may be configured to any number of blocks from a provided configuration. Erasing all content for a specific block height is simplified as all tables include a block number in their keys. If the cache size limit is 300, for example, the introduction of block 301 leads to the deletion of all key-value pairs at height 1, accomplished through subtraction (301-300). While this operation currently runs in O(n) time complexity in the existing implementation, the introduction of a third table can optimize this to O(1). In some cases, all keys with a specified height are scanned in the first table and deleted, which takes O(n) time, and the second table entry for 0x2 is removed, which takes O(1) time. If a third table was added, where the key equals the block height and the value equals a list of all block hashes for that height, the deletion operation may be optimized to O(1) time complexity. Additionally, if the first table supports compound keys, with 0(m) lookups where m is the number of subkeys from a given key shard, then the use of a third table to optimize deletion may not be necessary because the third table effectively manually implements a compound key. In this example, m is the number of cached blocks at a given height; m would be 1 in most cases and almost never exceed 2 or 3. Asymptotically, this may result in O(1) deletions.

The blockchain data cache is illustrated and described with respect to being implemented in conjunction with the external node validator 310. However, it should be understood that aspects of the blockchain data cache may be additionally or alternatively used with internal clusters (e.g., the blockchain node clusters 225). That is, the blockchain data cache 330 and the block listener may function without comparing data between external node providers (e.g., external blockchain data services 320). For example, requests or responses from a single or multiple internal node blockchain nodes may be used to reduce latency and operation load (e.g., requests may be services from the cache rather than the blockchain node clusters 225). Additionally, because the nodes are internal, comparisons between data obtained from additional nodes may not be a necessary condition in order to write data to the cache. However, in such cases, the blockchain data cache 330 may implement the reorg process, as described herein.

Figure 4:
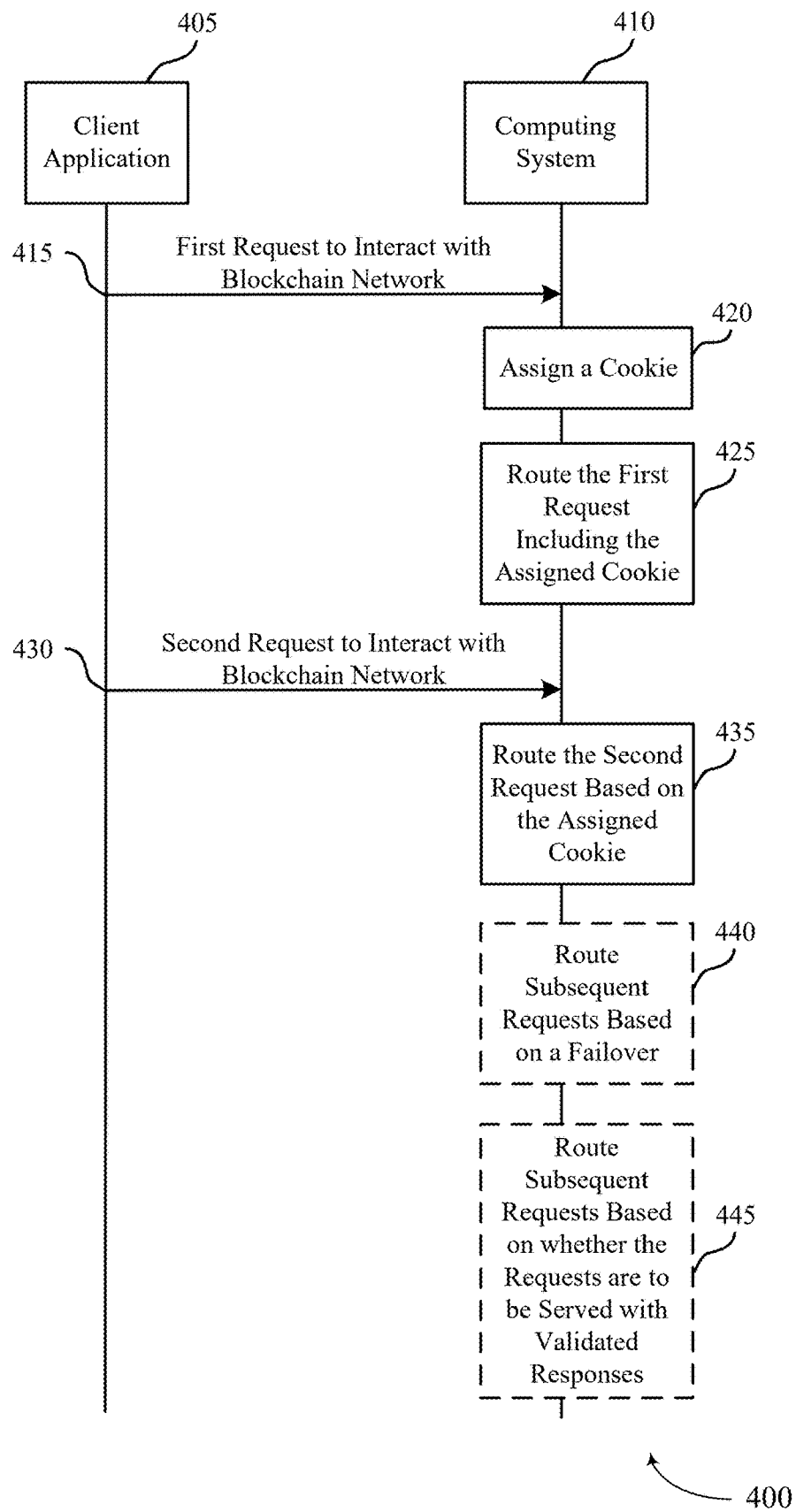
FIG. 4 shows an example of a process flow that supports blockchain data synchronization and service in accordance with aspects of the present disclosure.

FIG. 4 shows an example of a process flow 400 that supports blockchain data synchronization and service in accordance with aspects of the present disclosure. The process flow 400 includes a computing system 410 (e.g., supporting a blockchain data service for a blockchain service provider, such as a custodial token platform 110), which may be an example of computing system as described with respect to FIGS. 1 through 3. In some examples, the computing system 410 may be supported by a custodial token platform 110 of FIG. 1. In the following description of the process flow 400, the operations performed by the computing system 410 may be transmitted in a different order than the example order shown, or the operations performed may be performed in different orders or at different times. Some operations may also be omitted from the process flow 400, and other operations may be added to the process flow 400.

At 415, the computing system 410 may receive, from a first client application 405 and at the computing system 410 that hosts a set of worker nodes, a first request to interact with a blockchain network. The computing system may be configured to interact with a set of compute clusters, and each compute cluster of the set of compute clusters may execute a set of blockchain nodes for supporting the blockchain network. The first client application 405 may be an example of an internal or external service and may request the data in response to an internal operation or based on interaction by a user with a service supported by the blockchain service provider (e.g., a user creating/sending a transaction).

At 420, the computing system 410 may assign, to the first client application in response to receiving the first request, a cookie. The cookie may be an example of a sticky session cookie and may include data such as the client application identifier, a compute cluster identifier, an expiration time, or the like. At 425, the computing system 410 may route, using a worker node of the set of worker nodes and based on one or more routing factors, the first request to a first compute cluster of the set of compute clusters, the routed first request including the assigned cookie. The first request may be routed to the first compute cluster based on the one or more routing factors that comprise a weight associated with the first compute cluster, where the weight is indicative of a percentage of requests that are to be routed to the first compute cluster and wherein each compute cluster is associated with a respective weight. In some examples, the first request may be routed to the first compute cluster based on the first compute cluster being an active compute cluster and one or more other compute clusters of the set of compute clusters being passive compute clusters. In some examples, the computing system 410 may monitor the one or more routing factors that comprise a respective error rate for each compute cluster of the plurality compute clusters, where the first request is routed the first compute cluster based on the respective error rate associated with the first compute cluster. In such examples, the computing system 410 may assign the first compute cluster as a passive compute cluster based on an error rate associated with the first compute cluster exceeding an error rate threshold. The computing system 410 may assign a second compute cluster of the set of compute clusters as the active compute cluster.

At 430, the computing system 410 may receive, from the first client application of the user device, a second request to interact with the blockchain network. At 435, the computing system 410 may route, based on the cookie assigned to the first client application, the second request to the first compute cluster. The first compute cluster may be configured to route the second request to a blockchain node executed by the first compute cluster in accordance with the cookie assigned to the first client application.

In some examples, the computing system 410 may obtain, by a second worker node (e.g., an external node validator) of the set of worker nodes and from a first external blockchain data service, a first block of blockchain transaction data at a first block height on the blockchain network. The computing system 410 may obtain, by the worker node and from a second external blockchain data service, a second block of blockchain transaction data at the first block height on the blockchain network. The computing system 410 may determine that the first block obtained from the first external blockchain data service is inconsistent with the second block obtained from the second external blockchain data service. The computing system 410 may store in a cache in response to determining that the first block is inconsistent with the second block, the first block and the second block.

The computing system 410 may remove, from the cache based on a block height threshold being satisfied in the cache, one or more blocks at an oldest block height in the cache. The first request may be indicative of a block height that is not stored in the cache, where the computing system 410 obtains from the first external blockchain data service, a third block of blockchain transaction data at the indicated block height on the blockchain network. The computing system 410 may obtain, from the second external blockchain data service, a fourth block of blockchain transaction data at the indicated block height on the blockchain network. The computing system 410 may determine whether the third block is consistent with the fourth block, and the computing system 410 may return a response to the first request based on determining whether the third block is consistent with the fourth block.

In some examples, the computing system 410 may obtain a third block of blockchain transaction data at second block height subsequent to the first block height and where the third block of transaction data is subsequent to the first block of transaction data. The computing system 410 may update one or more tables associated with the cache to indicate that the third block is associated with a canonical chain on the blockchain network. In such examples, the computing system 410 may update the one or more tables associated with the cache to indicate that at least the first block that is prior to the third block is associated with the canonical chain on the blockchain network.

In some examples, at 440, the computing system 410 may route, in response to a failover at the first compute cluster, one or more requests subsequent to the second request to a second compute cluster of the set of compute clusters. In some examples, at 445, the computing system 410 may route one or more requests to one or more of the set of compute clusters based at least in part on whether the one or more requests are to be served with validated responses.

Figure 5:
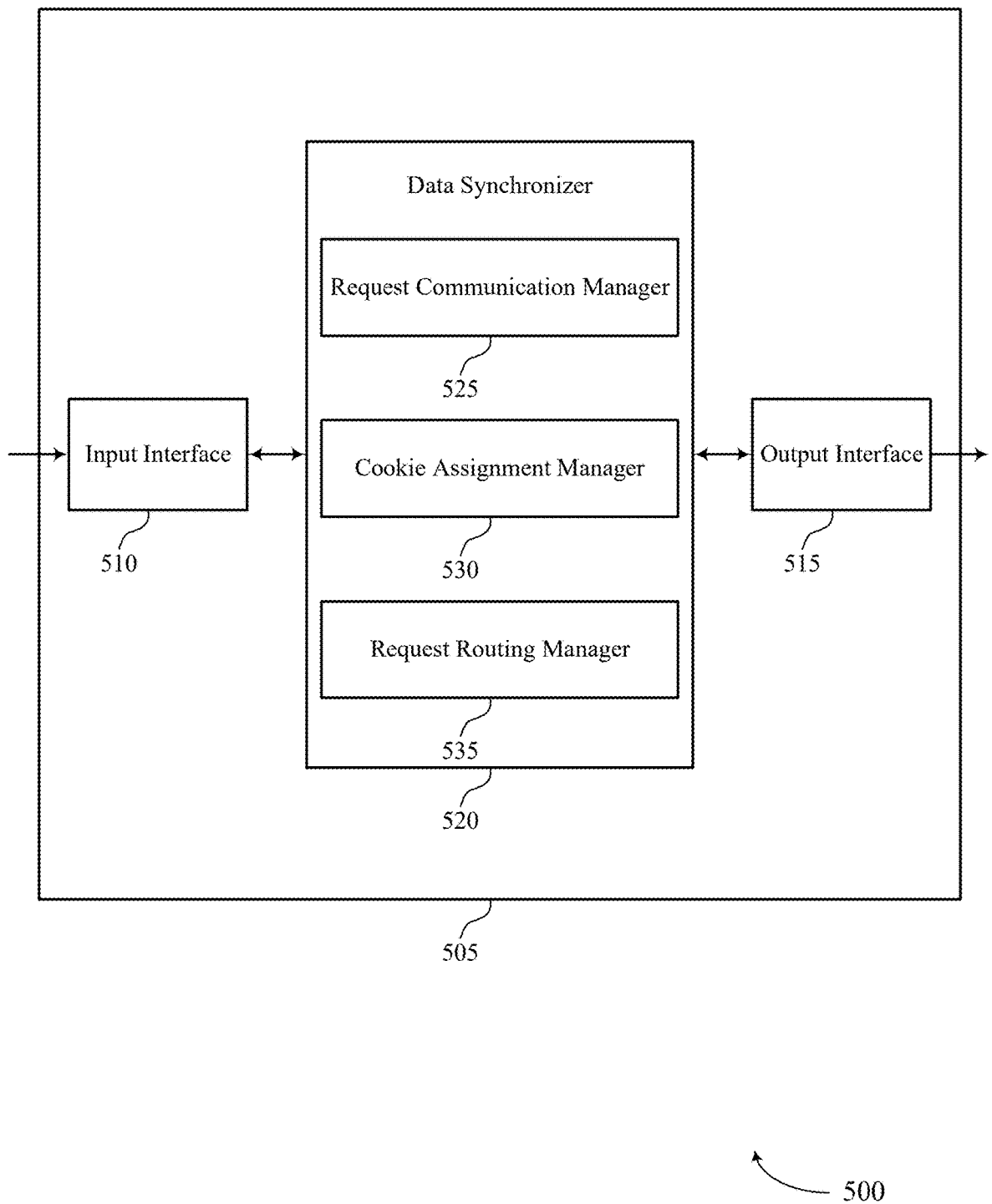
FIG. 5 shows a block diagram of an apparatus that supports blockchain data synchronization and service in accordance with aspects of the present disclosure.

FIG. 5 shows a block diagram 500 of a device 505 that supports blockchain data synchronization and service in accordance with aspects of the present disclosure. The device 505 may include an input interface 510, an output interface 515, and a data synchronizer 520. The device 505, or one or more components of the device 505 (e.g., the input interface 510, the output interface 515, the data synchronizer 520), may include at least one processor, which may be coupled with at least one memory, to support the described techniques. Each of these components may be in communication with one another (e.g., via one or more buses).

The input interface 510 may manage input signaling for the device 505. For example, the input interface 510 may receive input signaling (e.g., messages, packets, data, instructions, commands, transactions, or any other form of encoded information) from other systems or devices. The input interface 510 may send signaling corresponding to (e.g., representative of or otherwise based on) such input signaling to other components of the device 505 for processing. For example, the input interface 510 may transmit such corresponding signaling to the data synchronizer 520 to support blockchain data synchronization and service. In some cases, the input interface 510 may be a component of a network interface 725 as described with reference to FIG. 7.

The output interface 515 may manage output signaling for the device 505. For example, the output interface 515 may receive signaling from other components of the device 505, such as the data synchronizer 520, and may transmit such output signaling corresponding to (e.g., representative of or otherwise based on) such signaling to other systems or devices. In some cases, the output interface 515 may be a component of a network interface 725 as described with reference to FIG. 7.

For example, the data synchronizer 520 may include a request communication manager 525, a cookie assignment manager 530, a request routing manager 535, or any combination thereof. In some examples, the data synchronizer 520, or various components thereof, may be configured to perform various operations (e.g., receiving, monitoring, transmitting) using or otherwise in cooperation with the input interface 510, the output interface 515, or both. For example, the data synchronizer 520 may receive information from the input interface 510, send information to the output interface 515, or be integrated in combination with the input interface 510, the output interface 515, or both to receive information, transmit information, or perform various other operations as described herein.

The data synchronizer 520 may support data processing in accordance with examples as disclosed herein. The request communication manager 525 may be configured as or otherwise support a means for receiving, from a first client application and at a computing system that hosts a set of worker nodes, a first request to interact with a blockchain network, wherein the computing system is configured to interact with a set of compute clusters and wherein each compute cluster of the set of compute clusters executes a set of blockchain nodes for supporting the blockchain network. The cookie assignment manager 530 may be configured as or otherwise support a means for assigning to the first client application in response to receiving the first request, a cookie. The request routing manager 535 may be configured as or otherwise support a means for routing, using a worker node of the set of worker nodes and based at least in part on one or more routing factors, the first request to a first compute cluster of the set of compute clusters, the routed first request comprising the assigned cookie. The request communication manager 525 may be configured as or otherwise support a means for receiving, from the first client application, a second request to interact with the blockchain network. The request routing manager 535 may be configured as or otherwise support a means for routing, based at least in part on the cookie assigned to the first client application, the second request to the first compute cluster, wherein the first compute cluster is configured to route the second request to a blockchain node executed by the first compute cluster in accordance with the cookie assigned to the first client application.

Figure 6:
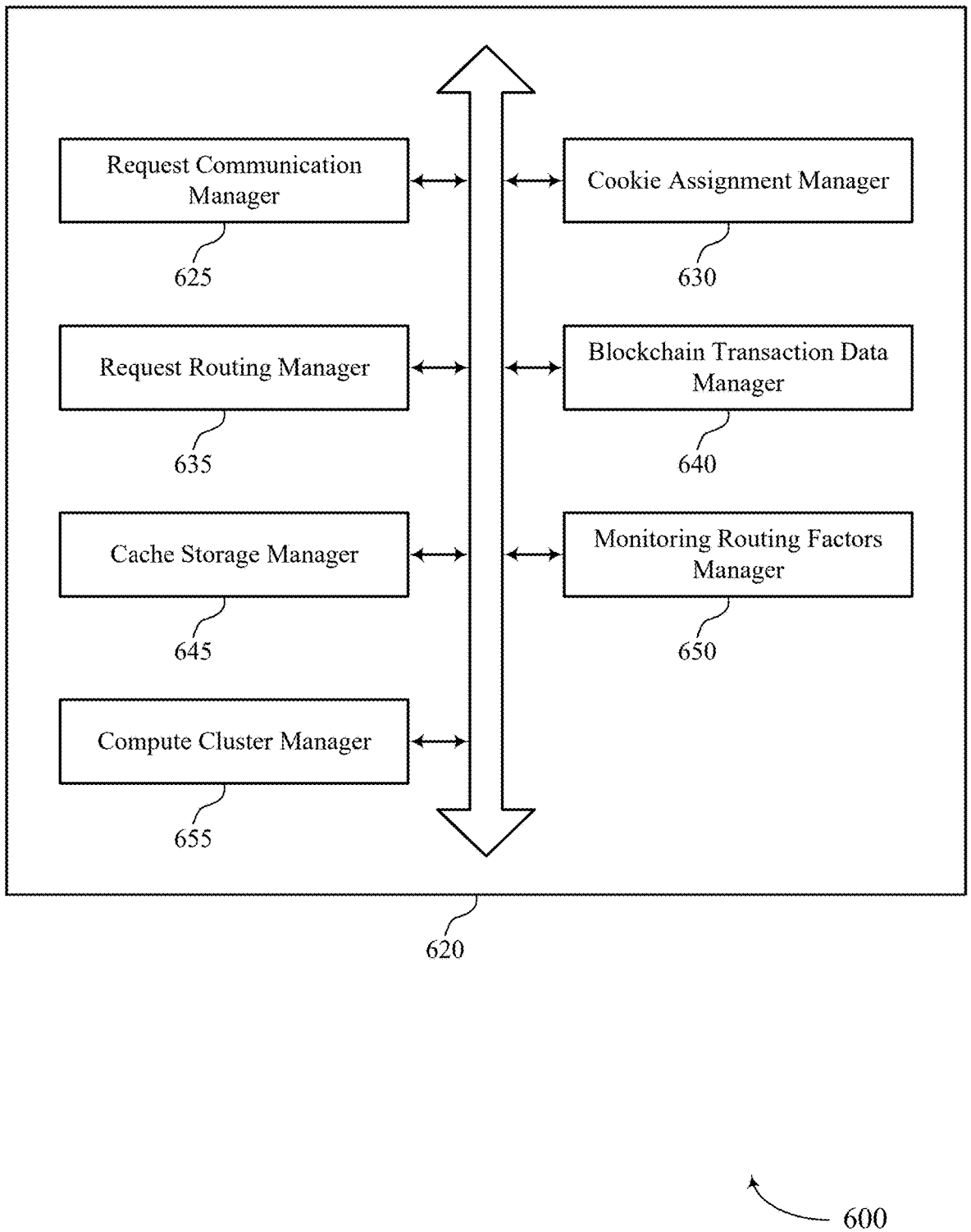
FIG. 6 shows a block diagram of a data synchronizer that supports blockchain data synchronization and service in accordance with aspects of the present disclosure.

FIG. 6 shows a block diagram 600 of a data synchronizer 620 that supports blockchain data synchronization and service in accordance with aspects of the present disclosure. The data synchronizer 620 may be an example of aspects of a data synchronizer or a data synchronizer 520, or both, as described herein. The data synchronizer 620, or various components thereof, may be an example of means for performing various aspects of blockchain data synchronization and service as described herein. For example, the data synchronizer 620 may include a request communication manager 625, a cookie assignment manager 630, a request routing manager 635, a blockchain transaction data manager 640, a cache storage manager 645, a monitoring routing factors manager 650, a compute cluster manager 655, or any combination thereof. Each of these components, or components of subcomponents thereof (e.g., one or more processors, one or more memories), may communicate, directly or indirectly, with one another (e.g., via one or more buses).

The data synchronizer 620 may support data processing in accordance with examples as disclosed herein. The request communication manager 625 may be configured as or otherwise support a means for receiving, from a first client application and at a computing system that hosts a set of worker nodes, a first request to interact with a blockchain network, wherein the computing system is configured to interact with a set of compute clusters and wherein each compute cluster of the set of compute clusters executes a set of blockchain nodes for supporting the blockchain network. The cookie assignment manager 630 may be configured as or otherwise support a means for assigning to the first client application in response to receiving the first request, a cookie. The request routing manager 635 may be configured as or otherwise support a means for routing, using a worker node of the set of worker nodes and based at least in part on one or more routing factors, the first request to a first compute cluster of the set of compute clusters, the routed first request comprising the assigned cookie. In some examples, the request communication manager 625 may be configured as or otherwise support a means for receiving, from the first client application, a second request to interact with the blockchain network. In some examples, the request routing manager 635 may be configured as or otherwise support a means for routing, based at least in part on the cookie assigned to the first client application, the second request to the first compute cluster, wherein the first compute cluster is configured to route the second request to a blockchain node executed by the first compute cluster in accordance with the cookie assigned to the first client application.

In some examples, the blockchain transaction data manager 640 may be configured as or otherwise support a means for obtaining, by a second worker node of the set of worker nodes and from a first external blockchain data service, a first block of blockchain transaction data at a first block height on the blockchain network. In some examples, the blockchain transaction data manager 640 may be configured as or otherwise support a means for obtaining, by the worker node and from a second external blockchain data service, a second block of blockchain transaction data at the first block height on the blockchain network. In some examples, the blockchain transaction data manager 640 may be configured as or otherwise support a means for determining that the first block obtained from the first external blockchain data service is inconsistent with the second block obtained from the second external blockchain data service. In some examples, the cache storage manager 645 may be configured as or otherwise support a means for storing, in a cache in response to determining that the first block is inconsistent with the second block, the first block and the second block.

In some examples, the cache storage manager 645 may be configured as or otherwise support a means for removing, from the cache based at least in part on a block height threshold being satisfied in the cache, one or more blocks at an oldest block height in the cache.

In some examples, the first request is indicative of a block height that is not stored in the cache, and the blockchain transaction data manager 640 may be configured as or otherwise support a means for obtaining from the first external blockchain data service, a third block of blockchain transaction data at the indicated block height on the blockchain network. In some examples, the first request is indicative of a block height that is not stored in the cache, and the blockchain transaction data manager 640 may be configured as or otherwise support a means for obtaining, from the second external blockchain data service, a fourth block of blockchain transaction data at the indicated block height on the blockchain network. In some examples, the first request is indicative of a block height that is not stored in the cache, and the blockchain transaction data manager 640 may be configured as or otherwise support a means for determining whether the third block is consistent with the fourth block. In some examples, the first request is indicative of a block height that is not stored in the cache, and the request communication manager 625 may be configured as or otherwise support a means for returning a response to the first request based at least in part on determining whether the third block is consistent with the fourth block.

In some examples, the blockchain transaction data manager 640 may be configured as or otherwise support a means for obtaining a third block of blockchain transaction data at second block height subsequent to the first block height and wherein the third block of transaction data is subsequent to the first block of transaction data. In some examples, the cache storage manager 645 may be configured as or otherwise support a means for updating one or more tables associated with the cache to indicate that the third block is associated with a canonical chain on the blockchain network.

In some examples, the blockchain transaction data manager 640 may be configured as or otherwise support a means for receiving, from the first external blockchain data service, a first response to a third request, the first response comprising first blockchain data corresponding to the third request, receiving, from the second external blockchain data service, a second response to the third request, the second response comprising second blockchain data corresponding to the third request, generating a first struct corresponding to the first response by parsing the first response, generating a second struct corresponding to the second response by parsing the second response, validating the first blockchain data and the second blockchain data by comparing the first and second struct, and serving data corresponding to the first struct and the second struct in response to validating the first blockchain data and the second blockchain data.

In some examples, the cache storage manager 645 may be configured as or otherwise support a means for updating the one or more tables associated with the cache to indicate that at least the first block that is prior to the third block is associated with the canonical chain on the blockchain network.

In some examples, the monitoring routing factors manager 650 may be configured as or otherwise support a means for monitoring the one or more routing factors that comprise a respective error rate for each compute cluster of the plurality compute clusters, wherein the first request is routed the first compute cluster based at least in part on the respective error rate associated with the first compute cluster.

In some examples, the first request is routed to the first compute cluster based at least in part on the one or more routing factors that comprise a weight associated with the first compute cluster. In some examples, the weight is indicative of a percentage of requests that are to be routed to the first compute cluster and. In some examples, each compute cluster is associated with a respective weight.

In some examples, the first request is routed to the first compute cluster based at least in part on the first compute cluster being an active compute cluster and one or more other compute clusters of the set of compute clusters being passive compute clusters.

In some examples, the compute cluster manager 655 may be configured as or otherwise support a means for assigning the first compute cluster as a passive compute cluster based at least in part on an error rate associated with the first compute cluster exceeding an error rate threshold. In some examples, the compute cluster manager 655 may be configured as or otherwise support a means for assigning a second compute cluster of the set of compute clusters as the active compute cluster. In some examples, the request communication manager 625 may be configured as or otherwise support a means for receiving, from the first client application, a third request to interact with the blockchain network. In some examples, the request routing manager 635 may be configured as or otherwise support a means for routing the third request to the second compute cluster based at least in part on the second compute cluster being the active compute cluster.

In some examples, the request routing manager 635 may be configured as or otherwise support a means for routing, in response to a failover at the first compute cluster, one or more requests subsequent to the second request to a second compute cluster of the set of compute clusters.

In some examples, the request routing manager 635 may be configured as or otherwise support a means for routing one or more requests to one or more of the set of compute clusters based at least in part on whether the one or more requests are to be served with validated responses.

Figure 7:
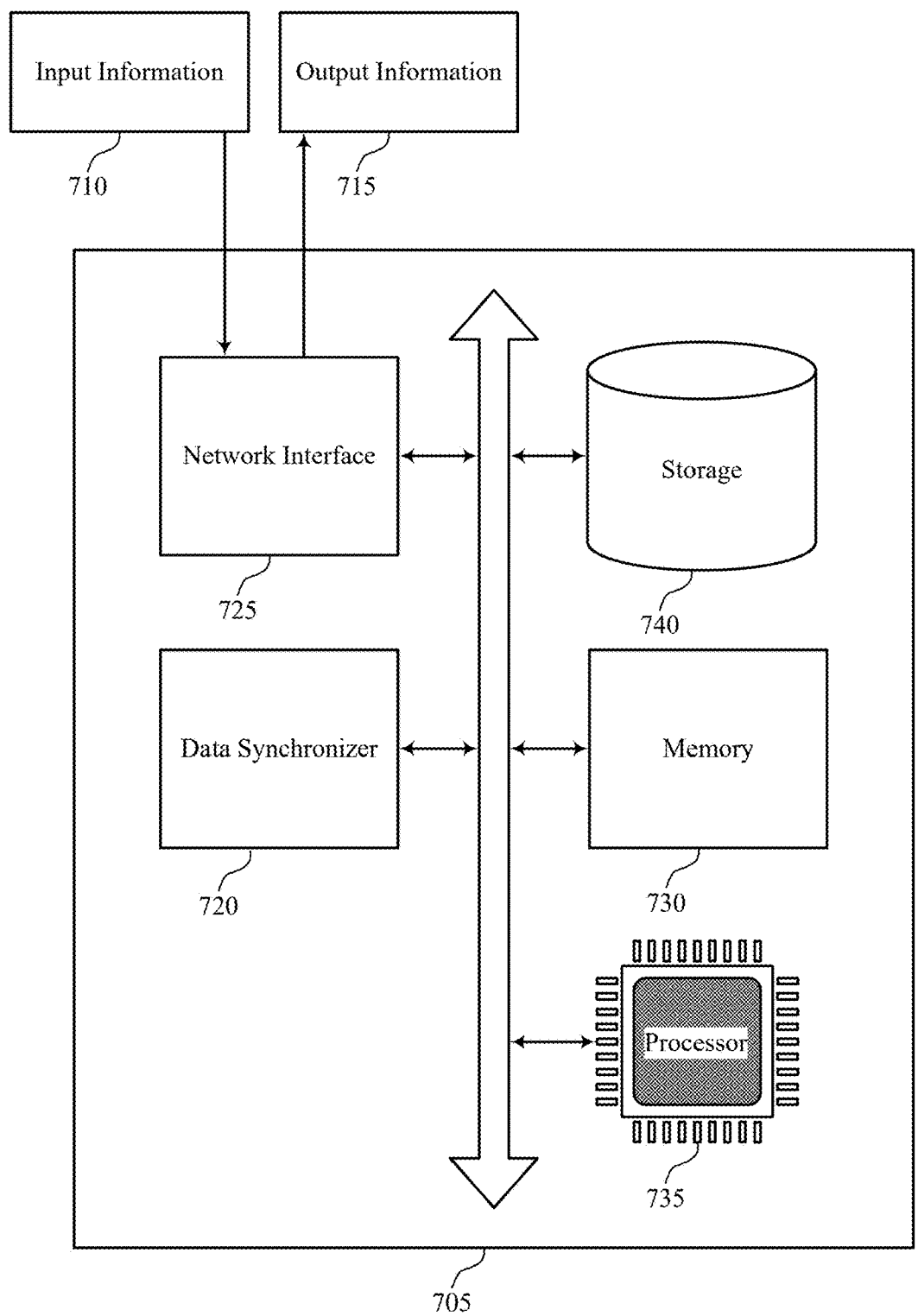
FIG. 7 shows a diagram of a system including a device that supports blockchain data synchronization and service in accordance with aspects of the present disclosure.

FIG. 7 shows a diagram of a system 700 including a device 705 that supports blockchain data synchronization and service in accordance with aspects of the present disclosure. The device 705 may be an example of or include components of a device 505 as described herein. The device 705 may include components for bi-directional voice and data communications including components for transmitting and receiving communications, such as a data synchronizer 720, an input information 710, an output information 715, a network interface 725, at least one memory 730, at least one processor 735, and a storage 740. Each of these components may communicate, directly or indirectly, with one another (e.g., via one or more buses, communications links, communications interfaces, or any combination thereof).

The network interface 725 may enable the device 705 to exchange information (e.g., input information 710, output information 715, or both) with other systems or devices (not shown). For example, the network interface 725 may enable the device 705 to connect to a network (e.g., a network 135 as described herein). The network interface 725 may include one or more wireless network interfaces, one or more wired network interfaces, or any combination thereof.

Memory 730 may include RAM, ROM, or both. The memory 730 may store computer-readable, computer-executable software including instructions that, when executed, cause at least one processor 735 to perform various functions described herein, such as functions supporting blockchain data synchronization and service. In some cases, the memory 730 may contain, among other things, a basic input/output system (BIOS), which may control basic hardware or software operation such as the interaction with peripheral components or devices. In some cases, the memory 730 may be an example of aspects of one or more components of a custodial token platform 110 as described with reference to FIG. 1. The memory 730 may be an example of a single memory or multiple memories. For example, the device 705 may include one or more memories 730.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in at least one memory 730 to perform various functions (e.g., functions or tasks supporting blockchain data synchronization and service). Though a single processor 735 is depicted in the example of FIG. 7, it is to be understood that the device 705 may include any quantity of one or more of processors 735 and that a group of processors 735 may collectively perform one or more functions ascribed herein to a processor, such as the processor 735. The processor 735 may be an example of a single processor or multiple processors. For example, the device 705 may include one or more processors 735.

Storage 740 may be configured to store data that is generated, processed, stored, or otherwise used by the device 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1.

The data synchronizer 720 may support data processing in accordance with examples as disclosed herein. For example, the data synchronizer 720 may be configured as or otherwise support a means for receiving, from a first client application and at a computing system that hosts a set of worker nodes, a first request to interact with a blockchain network, wherein the computing system is configured to interact with a set of compute clusters and wherein each compute cluster of the set of compute clusters executes a set of blockchain nodes for supporting the blockchain network. The data synchronizer 720 may be configured as or otherwise support a means for assigning to the first client application in response to receiving the first request, a cookie. The data synchronizer 720 may be configured as or otherwise support a means for routing, using a worker node of the set of worker nodes and based at least in part on one or more routing factors, the first request to a first compute cluster of the set of compute clusters, the routed first request comprising the assigned cookie. The data synchronizer 720 may be configured as or otherwise support a means for receiving, from the first client application, a second request to interact with the blockchain network. The data synchronizer 720 may be configured as or otherwise support a means for routing, based on the cookie assigned to the first client application, the second request to the first compute cluster, wherein the first compute cluster is configured to route the second request to a blockchain node executed by the first compute cluster in accordance with the cookie assigned to the first client application.

By including or configuring the data synchronizer 720 in accordance with examples as described herein, the device 705 may support techniques for efficiently routing and rerouting blockchain requests to blockchain nodes, for example, for a failover operation or to reduce power consumption.

Figure 8:
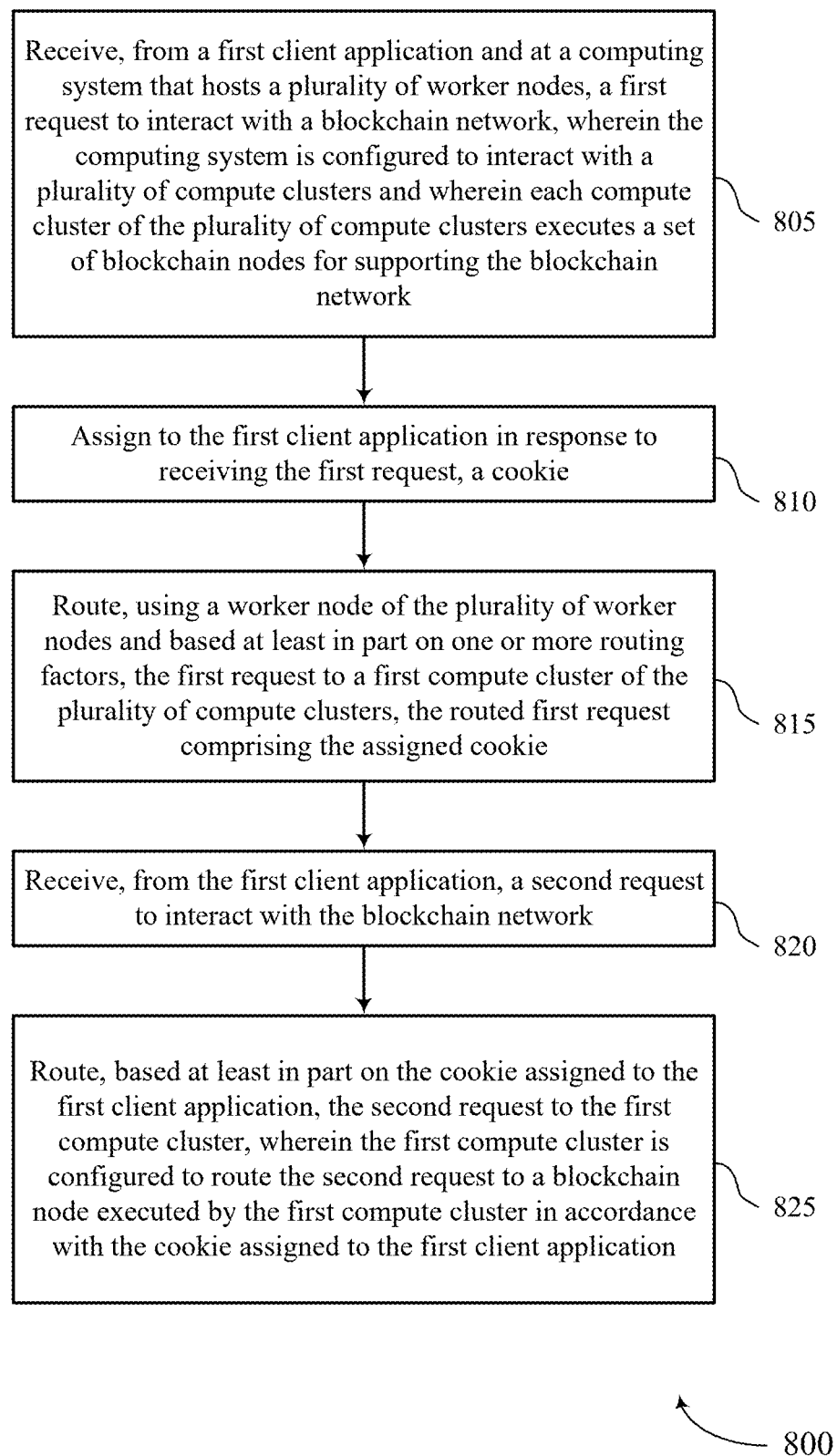
FIGS. 8 through 10 show flowcharts illustrating methods that support blockchain data synchronization and service in accordance with aspects of the present disclosure.

FIG. 8 shows a flowchart illustrating a method 800 that supports blockchain data synchronization and service in accordance with aspects of the present disclosure. The operations of the method 800 may be implemented by a custodial token platform or its components as described herein. For example, the operations of the method 800 may be performed by a custodial token platform as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 805, the method may include receiving, from a first client application and at a computing system that hosts a set of worker nodes, a first request to interact with a blockchain network, wherein the computing system is configured to interact with a set of compute clusters and wherein each compute cluster of the set of compute clusters executes a set of blockchain nodes for supporting the blockchain network. The operations of 805 may be performed in accordance with examples as disclosed herein. In some examples, aspects of the operations of 805 may be performed by a request communication manager 625 as described with reference to FIG. 6.

At 810, the method may include assigning to the first client application in response to receiving the first request, a cookie. The operations of 810 may be performed in accordance with examples as disclosed herein. In some examples, aspects of the operations of 810 may be performed by a cookie assignment manager 630 as described with reference to FIG. 6.

At 815, the method may include routing, using a worker node of the set of worker nodes and based at least in part on one or more routing factors, the first request to a first compute cluster of the set of compute clusters, the routed first request comprising the assigned cookie. The operations of 815 may be performed in accordance with examples as disclosed herein. In some examples, aspects of the operations of 815 may be performed by a request routing manager 635 as described with reference to FIG. 6.

At 820, the method may include receiving, from the first client application, a second request to interact with the blockchain network. The operations of 820 may be performed in accordance with examples as disclosed herein. In some examples, aspects of the operations of 820 may be performed by a request communication manager 625 as described with reference to FIG. 6.

At 825, the method may include routing, based at least in part on the cookie assigned to the first client application, the second request to the first compute cluster, wherein the first compute cluster is configured to route the second request to a blockchain node executed by the first compute cluster in accordance with the cookie assigned to the first client application. The operations of 825 may be performed in accordance with examples as disclosed herein. In some examples, aspects of the operations of 825 may be performed by a request routing manager 635 as described with reference to FIG. 6.

Figure 9:
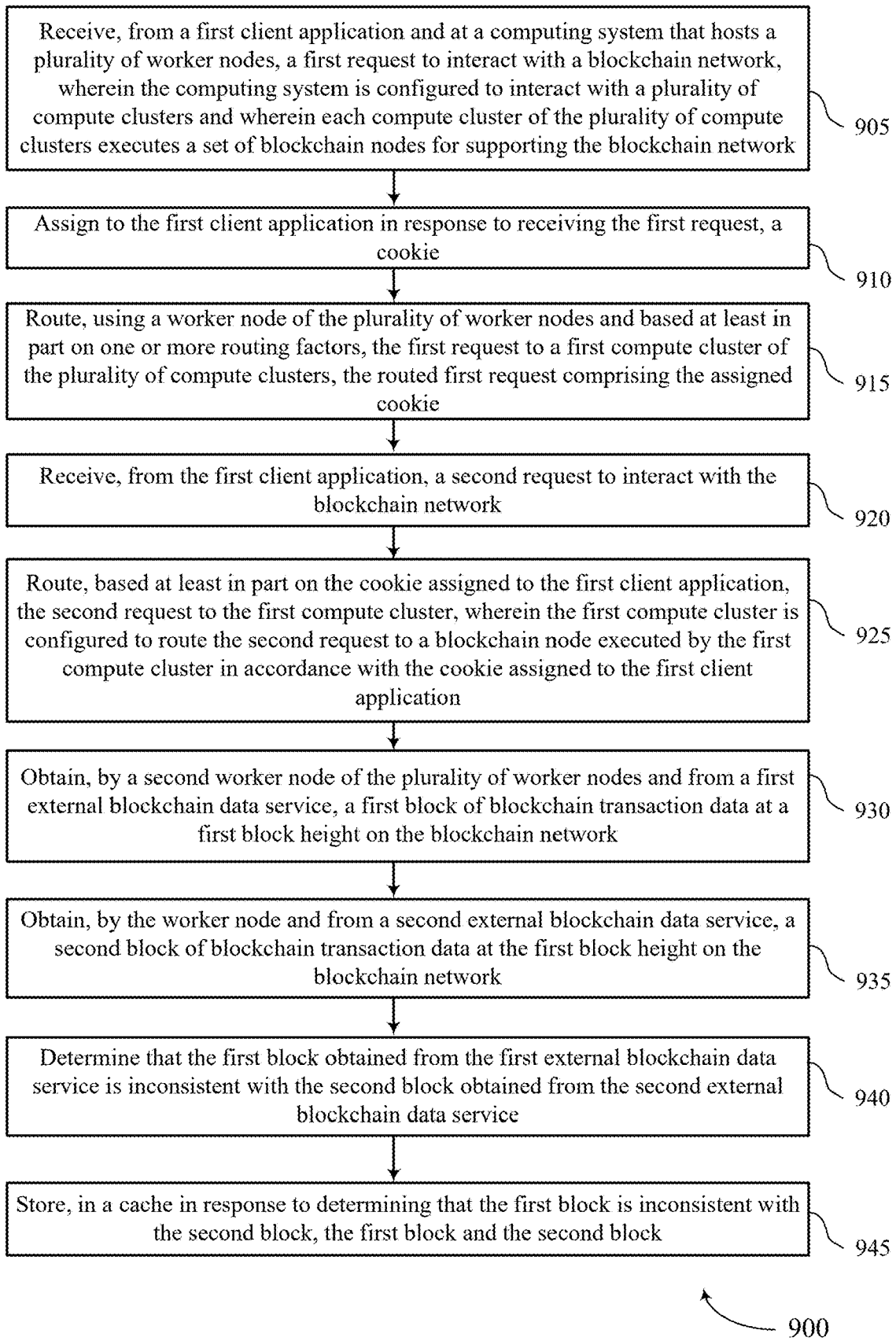

FIG. 9 shows a flowchart illustrating a method 900 that supports blockchain data synchronization and service in accordance with aspects of the present disclosure. The operations of the method 900 may be implemented by a custodial token platform or its components as described herein. For example, the operations of the method 900 may be performed by a custodial token platform as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 905, the method may include receiving, from a first client application and at a computing system that hosts a set of worker nodes, a first request to interact with a blockchain network, wherein the computing system is configured to interact with a set of compute clusters and wherein each compute cluster of the set of compute clusters executes a set of blockchain nodes for supporting the blockchain network. The operations of 905 may be performed in accordance with examples as disclosed herein. In some examples, aspects of the operations of 905 may be performed by a request communication manager 625 as described with reference to FIG. 6.

At 910, the method may include assigning to the first client application in response to receiving the first request, a cookie. The operations of 910 may be performed in accordance with examples as disclosed herein. In some examples, aspects of the operations of 910 may be performed by a cookie assignment manager 630 as described with reference to FIG. 6.

At 915, the method may include routing, using a worker node of the set of worker nodes and based at least in part on one or more routing factors, the first request to a first compute cluster of the set of compute clusters, the routed first request comprising the assigned cookie. The operations of 915 may be performed in accordance with examples as disclosed herein. In some examples, aspects of the operations of 915 may be performed by a request routing manager 635 as described with reference to FIG. 6.

At 920, the method may include receiving, from the first client application, a second request to interact with the blockchain network. The operations of 920 may be performed in accordance with examples as disclosed herein. In some examples, aspects of the operations of 920 may be performed by a request communication manager 625 as described with reference to FIG. 6.

At 925, the method may include routing, based at least in part on the cookie assigned to the first client application, the second request to the first compute cluster, wherein the first compute cluster is configured to route the second request to a blockchain node executed by the first compute cluster in accordance with the cookie assigned to the first client application. The operations of 925 may be performed in accordance with examples as disclosed herein. In some examples, aspects of the operations of 925 may be performed by a request routing manager 635 as described with reference to FIG. 6.

At 930, the method may include obtaining, by a second worker node of the set of worker nodes and from a first external blockchain data service, a first block of blockchain transaction data at a first block height on the blockchain network. The operations of 930 may be performed in accordance with examples as disclosed herein. In some examples, aspects of the operations of 930 may be performed by a blockchain transaction data manager 640 as described with reference to FIG. 6.

At 935, the method may include obtaining, by the worker node and from a second external blockchain data service, a second block of blockchain transaction data at the first block height on the blockchain network. The operations of 935 may be performed in accordance with examples as disclosed herein. In some examples, aspects of the operations of 935 may be performed by a blockchain transaction data manager 640 as described with reference to FIG. 6.

At 940, the method may include determining that the first block obtained from the first external blockchain data service is inconsistent with the second block obtained from the second external blockchain data service. The operations of 940 may be performed in accordance with examples as disclosed herein. In some examples, aspects of the operations of 940 may be performed by a blockchain transaction data manager 640 as described with reference to FIG. 6.

At 945, the method may include storing, in a cache in response to determining that the first block is inconsistent with the second block, the first block and the second block. The operations of 945 may be performed in accordance with examples as disclosed herein. In some examples, aspects of the operations of 945 may be performed by a cache storage manager 645 as described with reference to FIG. 6.

Figure 10:
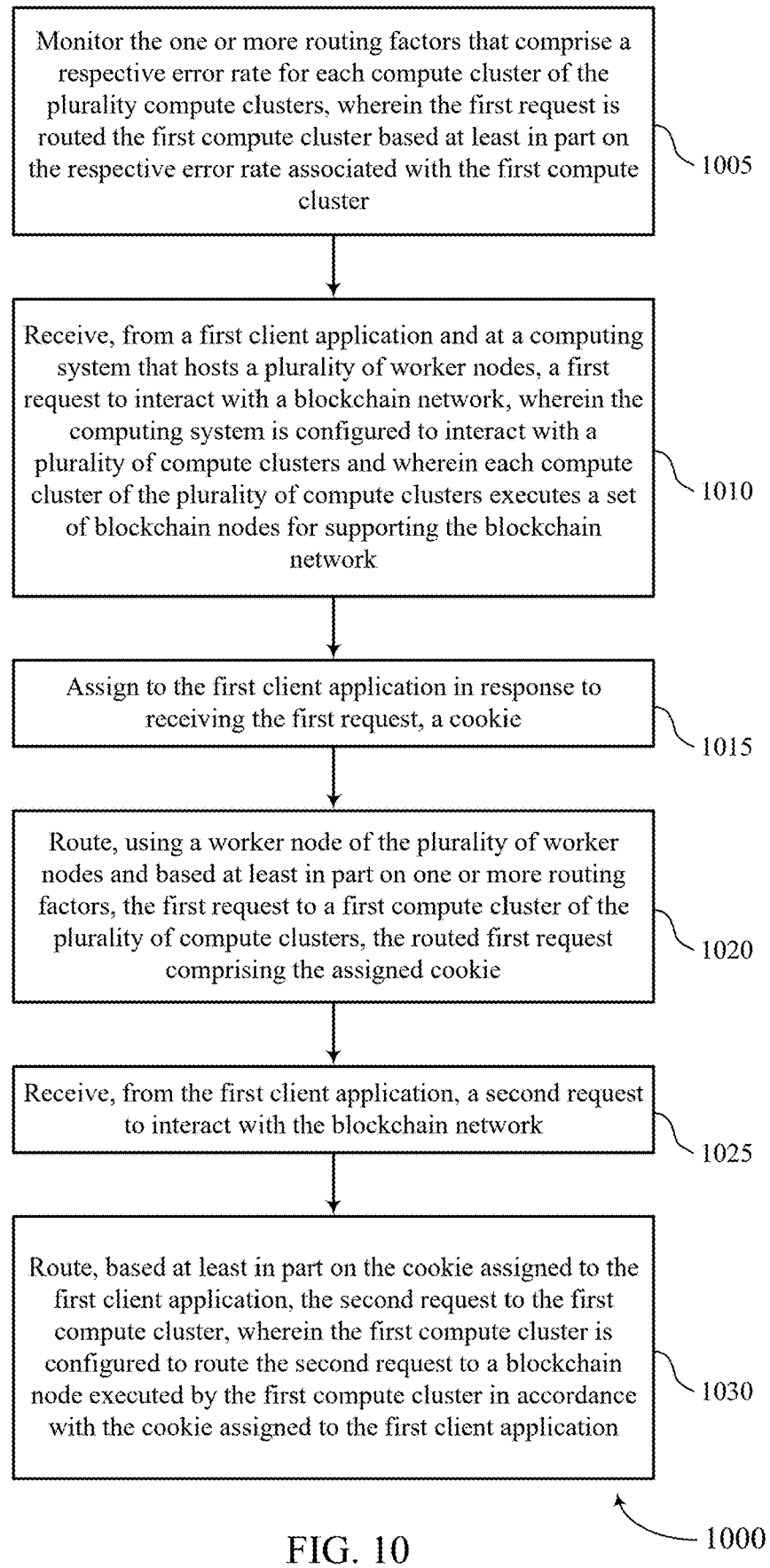

FIG. 10 shows a flowchart illustrating a method 1000 that supports blockchain data synchronization and service in accordance with aspects of the present disclosure. The operations of the method 1000 may be implemented by a custodial token platform or its components as described herein. For example, the operations of the method 1000 may be performed by a custodial token platform as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 1005, the method may include monitoring the one or more routing factors that comprise a respective error rate for each compute cluster of the plurality compute clusters, wherein the first request is routed the first compute cluster based at least in part on the respective error rate associated with the first compute cluster. The operations of 1005 may be performed in accordance with examples as disclosed herein. In some examples, aspects of the operations of 1005 may be performed by a monitoring routing factors manager 650 as described with reference to FIG. 6.

At 1010, the method may include receiving, from a first client application and at a computing system that hosts a set of worker nodes, a first request to interact with a blockchain network, wherein the computing system is configured to interact with a set of compute clusters and wherein each compute cluster of the set of compute clusters executes a set of blockchain nodes for supporting the blockchain network. The operations of 1010 may be performed in accordance with examples as disclosed herein. In some examples, aspects of the operations of 1010 may be performed by a request communication manager 625 as described with reference to FIG. 6.

At 1015, the method may include assigning to the first client application in response to receiving the first request, a cookie. The operations of 1015 may be performed in accordance with examples as disclosed herein. In some examples, aspects of the operations of 1015 may be performed by a cookie assignment manager 630 as described with reference to FIG. 6.

At 1020, the method may include routing, using a worker node of the set of worker nodes and based at least in part on one or more routing factors, the first request to a first compute cluster of the set of compute clusters, the routed first request comprising the assigned cookie. The operations of 1020 may be performed in accordance with examples as disclosed herein. In some examples, aspects of the operations of 1020 may be performed by a request routing manager 635 as described with reference to FIG. 6.

At 1025, the method may include receiving, from the first client application, a second request to interact with the blockchain network. The operations of 1025 may be performed in accordance with examples as disclosed herein. In some examples, aspects of the operations of 1025 may be performed by a request communication manager 625 as described with reference to FIG. 6.

At 1030, the method may include routing, based at least in part on the cookie assigned to the first client application, the second request to the first compute cluster, wherein the first compute cluster is configured to route the second request to a blockchain node executed by the first compute cluster in accordance with the cookie assigned to the first client application. The operations of 1030 may be performed in accordance with examples as disclosed herein. In some examples, aspects of the operations of 1030 may be performed by a request routing manager 635 as described with reference to FIG. 6.

A method for data processing by an apparatus is described. The method may include receiving, from a first client application and at a computing system that hosts a set of worker nodes, a first request to interact with a blockchain network, wherein the computing system is configured to interact with a set of compute clusters and wherein each compute cluster of the set of compute clusters executes a set of blockchain nodes for supporting the blockchain network, assigning to the first client application in response to receiving the first request, a cookie, routing, using a worker node of the set of worker nodes and based at least in part on one or more routing factors, the first request to a first compute cluster of the set of compute clusters, the routed first request comprising the assigned cookie, receiving, from the first client application, a second request to interact with the blockchain network, and routing, based at least in part on the cookie assigned to the first client application, the second request to the first compute cluster, wherein the first compute cluster is configured to route the second request to a blockchain node executed by the first compute cluster in accordance with the cookie assigned to the first client application.

An apparatus for data processing is described. The apparatus may include one or more memories storing processor executable code, and one or more processors coupled with the one or more memories. The one or more processors may individually or collectively be operable to execute the code to cause the apparatus to receive, from a first client application and at a computing system that hosts a set of worker nodes, a first request to interact with a blockchain network, wherein the computing system is configured to interact with a set of compute clusters and wherein each compute cluster of the set of compute clusters executes a set of blockchain nodes for supporting the blockchain network, assign to the first client application in response to receiving the first request, a cookie, routing, using a worker node of the set of worker nodes and based at least in part on one or more routing factors, the first request to a first compute cluster of the set of compute clusters, the routed first request comprising the assigned cookie, receive, from the first client application, a second request to interact with the blockchain network, and routing, based at least in part on the cookie assigned to the first client application, the second request to the first compute cluster, wherein the first compute cluster is configured to route the second request to a blockchain node executed by the first compute cluster in accordance with the cookie assigned to the first client application.

Another apparatus for data processing is described. The apparatus may include means for receiving, from a first client application and at a computing system that hosts a set of worker nodes, a first request to interact with a blockchain network, wherein the computing system is configured to interact with a set of compute clusters and wherein each compute cluster of the set of compute clusters executes a set of blockchain nodes for supporting the blockchain network, means for assigning to the first client application in response to receiving the first request, a cookie, means for routing, using a worker node of the set of worker nodes and based at least in part on one or more routing factors, the first request to a first compute cluster of the set of compute clusters, the routed first request comprising the assigned cookie, means for receiving, from the first client application, a second request to interact with the blockchain network, and means for routing, based at least in part on the cookie assigned to the first client application, the second request to the first compute cluster, wherein the first compute cluster is configured to route the second request to a blockchain node executed by the first compute cluster in accordance with the cookie assigned to the first client application.

A non-transitory computer-readable medium storing code for data processing is described. The code may include instructions executable by one or more processors to receive, from a first client application and at a computing system that hosts a set of worker nodes, a first request to interact with a blockchain network, wherein the computing system is configured to interact with a set of compute clusters and wherein each compute cluster of the set of compute clusters executes a set of blockchain nodes for supporting the blockchain network, assign to the first client application in response to receiving the first request, a cookie, routing, using a worker node of the set of worker nodes and based at least in part on one or more routing factors, the first request to a first compute cluster of the set of compute clusters, the routed first request comprising the assigned cookie, receive, from the first client application, a second request to interact with the blockchain network, and routing, based on the cookie assigned to the first client application, the second request to the first compute cluster, wherein the first compute cluster is configured to route the second request to a blockchain node executed by the first compute cluster in accordance with the cookie assigned to the first client application.

Some examples of the method, apparatus, and non-transitory computer-readable medium described herein may further include operations, features, means, or instructions for obtaining, by a second worker node of the set of worker nodes and from a first external blockchain data service, a first block of blockchain transaction data at a first block height on the blockchain network, obtaining, by the worker node and from a second external blockchain data service, a second block of blockchain transaction data at the first block height on the blockchain network, determining that the first block obtained from the first external blockchain data service may be inconsistent with the second block obtained from the second external blockchain data service, and storing, in a cache in response to determining that the first block may be inconsistent with the second block, the first block and the second block.

Some examples of the method, apparatus, and non-transitory computer-readable medium described herein may further include operations, features, means, or instructions for removing, from the cache based at least in part on a block height threshold being satisfied in the cache, one or more blocks at an oldest block height in the cache.

In some examples of the method, apparatus, and non-transitory computer-readable medium described herein, the first request may be indicative of a block height that may be not stored in the cache and the method, apparatuses, and non-transitory computer-readable medium may include further operations, features, means, or instructions for obtaining from the first external blockchain data service, a third block of blockchain transaction data at the indicated block height on the blockchain network, obtaining, from the second external blockchain data service, a fourth block of blockchain transaction data at the indicated block height on the blockchain network, determining whether the third block may be consistent with the fourth block, and returning a response to the first request based at least in part on determining whether the third block may be consistent with the fourth block.

Some examples of the method, apparatus, and non-transitory computer-readable medium described herein may further include operations, features, means, or instructions for obtaining a third block of blockchain transaction data at second block height subsequent to the first block height and wherein the third block of transaction data may be subsequent to the first block of transaction data and updating one or more tables associated with the cache to indicate that the third block may be associated with a canonical chain on the blockchain network.

Some examples of the method, apparatus, and non-transitory computer-readable medium described herein may further include operations, features, means, or instructions for updating the one or more tables associated with the cache to indicate that at least the first block that may be prior to the third block may be associated with the canonical chain on the blockchain network.

Some examples of the method, apparatus, and non-transitory computer-readable medium described herein may further include operations, features, means, or instructions for monitoring the one or more routing factors that comprise a respective error rate for each compute cluster of the plurality compute clusters, wherein the first request may be routed the first compute cluster based at least in part on the respective error rate associated with the first compute cluster.

In some examples of the method, apparatus, and non-transitory computer-readable medium described herein, the first request may be routed to the first compute cluster based at least in part on the one or more routing factors that comprise a weight associated with the first compute cluster, the weight may be indicative of an percentage of requests that are to be routed to the first compute cluster and, and each compute cluster may be associated with a respective weight.

In some examples of the method, apparatus, and non-transitory computer-readable medium described herein, the first request may be routed to the first compute cluster based at least in part on the first compute cluster being an active compute cluster and one or more other compute clusters of the set of compute clusters being passive compute clusters.

Some examples of the method, apparatus, and non-transitory computer-readable medium described herein may further include operations, features, means, or instructions for assigning the first compute cluster as a passive compute cluster based at least in part on an error rate associated with the first compute cluster exceeding an error rate threshold, assigning a second compute cluster of the set of compute clusters as the active compute cluster, receiving, from the first client application, a third request to interact with the blockchain network, and routing the third request to the second compute cluster based at least in part on the second compute cluster being the active compute cluster.

In some examples of the method, apparatus, and non-transitory computer-readable medium described herein, routing, in response to a failover at the first compute cluster, one or more requests subsequent to the second request to a second compute cluster of the set of compute clusters.

Some examples of the method, apparatus, and non-transitory computer-readable medium described herein may further include operations, features, means, or instructions for routing one or more requests to one or more of the set of compute clusters based on whether the one or more requests are to be served with validated responses.

Some examples of the method, apparatus, and non-transitory computer-readable medium described herein may further include operations, features, means, or instructions for receiving, from the first external blockchain data service, a first response to a third request, the first response comprising first blockchain data corresponding to the third request, receiving, from the second external blockchain data service, a second response to the third request, the second response comprising second blockchain data corresponding to the third request, generating a first struct corresponding to the first response by parsing the first response, generating a second struct corresponding to the second response by parsing the second response, validating the first blockchain data and the second blockchain data by comparing the first and second struct, and serving data corresponding to the first struct and the second struct in response to validating the first blockchain data and the second blockchain data.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data processing, comprising:
    receiving, from a first client application and at a computing system that hosts a plurality of worker nodes, a first request to interact with a blockchain network, wherein the computing system is configured to interact with a plurality of compute clusters and wherein each compute cluster of the plurality of compute clusters executes a set of blockchain nodes for supporting the blockchain network;
    assigning to the first client application in response to receiving the first request, a cookie;
    routing, using a worker node of the plurality of worker nodes and based at least in part on one or more routing factors, the first request to a first compute cluster of the plurality of compute clusters, the routed first request comprising the assigned cookie;
    receiving, from the first client application, a second request to interact with the blockchain network; and
    routing, based at least in part on the cookie assigned to the first client application, the second request to the first compute cluster, wherein the first compute cluster is configured to route the second request to a blockchain node executed by the first compute cluster in accordance with the cookie assigned to the first client application.

2. The method of claim 1, further comprising:
    obtaining, by a second worker node of the plurality of worker nodes and from a first external blockchain data service, a first block of blockchain transaction data at a first block height on the blockchain network;
    obtaining, by the worker node and from a second external blockchain data service, a second block of blockchain transaction data at the first block height on the blockchain network;
    determining that the first block obtained from the first external blockchain data service is inconsistent with the second block obtained from the second external blockchain data service; and
    storing, in a cache in response to determining that the first block is inconsistent with the second block, the first block and the second block.

3. The method of claim 2, further comprising:
    removing, from the cache based at least in part on a block height threshold being satisfied in the cache, one or more blocks at an oldest block height in the cache.

4. The method of claim 2, wherein the first request is indicative of a block height that is not stored in the cache, the method further comprising:
    obtaining from the first external blockchain data service, a third block of blockchain transaction data at the indicated block height on the blockchain network;
    obtaining, from the second external blockchain data service, a fourth block of blockchain transaction data at the indicated block height on the blockchain network;
    determining whether the third block is consistent with the fourth block; and
    returning a response to the first request based at least in part on determining whether the third block is consistent with the fourth block.

5. The method of claim 2, further comprising:
    obtaining a third block of blockchain transaction data at second block height subsequent to the first block height and wherein the third block of blockchain transaction data is subsequent to the first block of blockchain transaction data; and
    updating one or more tables associated with the cache to indicate that the third block is associated with a canonical chain on the blockchain network.

6. The method of claim 5, further comprising:
    updating the one or more tables associated with the cache to indicate that at least the first block that is prior to the third block is associated with the canonical chain on the blockchain network.

7. The method of claim 2, further comprising:
    receiving, from the first external blockchain data service, a first response to a third request, the first response comprising first blockchain data corresponding to the third request;
    receiving, from the second external blockchain data service, a second response to the third request, the second response comprising second blockchain data corresponding to the third request;
    generating a first struct corresponding to the first response by parsing the first response;
    generating a second struct corresponding to the second response by parsing the second response;
    validating the first blockchain data and the second blockchain data by comparing the first struct and the second struct; and
    serving data corresponding to the first struct and the second struct in response to validating the first blockchain data and the second blockchain data.

8. The method of claim 1, further comprising:
    monitoring the one or more routing factors that comprise a respective error rate for each compute cluster of the plurality of compute clusters, wherein the first request is routed to the first compute cluster based at least in part on the respective error rate associated with the first compute cluster.

9. The method of claim 1, wherein:
    the first request is routed to the first compute cluster based at least in part on the one or more routing factors that comprise a weight associated with the first compute cluster, the weight is indicative of an percentage of requests that are to be routed to the first compute cluster, and each compute cluster is associated with a respective weight.

10. The method of claim 1, wherein the first request is routed to the first compute cluster based at least in part on the first compute cluster being an active compute cluster and one or more other compute clusters of the plurality of compute clusters being passive compute clusters.

11. The method of claim 10, further comprising:
assigning the first compute cluster as a passive compute cluster based at least in part on an error rate associated with the first compute cluster exceeding an error rate threshold;
assigning a second compute cluster of the plurality of compute clusters as the active compute cluster;
receiving, from the first client application, a third request to interact with the blockchain network; and
routing the third request to the second compute cluster based at least in part on the second compute cluster being the active compute cluster.

12. The method of claim 1, further comprising:
routing, in response to a failover at the first compute cluster, one or more requests subsequent to the second request to a second compute cluster of the plurality of compute clusters.

13. The method of claim 1, further comprising:
routing one or more requests to one or more of the plurality of compute clusters based at least in part on whether the one or more requests are to be served with validated responses.

14. An apparatus for data processing, comprising:
one or more memories storing processor-executable code; and
one or more processors coupled with the one or more memories and individually or collectively operable to execute the code to cause the apparatus to:
receive, from a first client application and at a computing system that hosts a plurality of worker nodes, a first request to interact with a blockchain network, wherein the computing system is configured to interact with a plurality of compute clusters and wherein each compute cluster of the plurality of compute clusters executes a set of blockchain nodes for supporting the blockchain network;
assign to the first client application in response to receiving the first request, a cookie;
route, using a worker node of the plurality of worker nodes and based at least in part on one or more routing factors, the first request to a first compute cluster of the plurality of compute clusters, the routed first request comprising the assigned cookie;
receive, from the first client application, a second request to interact with the blockchain network; and
route, based at least in part on the cookie assigned to the first client application, the second request to the first compute cluster, wherein the first compute cluster is configured to route the second request to a blockchain node executed by the first compute cluster in accordance with the cookie assigned to the first client application.

15. The apparatus of claim 14, wherein the one or more processors are individually or collectively further operable to execute the code to cause the apparatus to:
obtain, by a second worker node of the plurality of worker nodes and from a first external blockchain data service, a first block of blockchain transaction data at a first block height on the blockchain network;
obtain, by the worker node and from a second external blockchain data service, a second block of blockchain transaction data at the first block height on the blockchain network;
determine that the first block obtained from the first external blockchain data service is inconsistent with the second block obtained from the second external blockchain data service; and
store, in a cache in response to determining that the first block is inconsistent with the second block, the first block and the second block.

16. The apparatus of claim 15, wherein the one or more processors are individually or collectively further operable to execute the code to cause the apparatus to:
remove, from the cache based at least in part on a block height threshold being satisfied in the cache, one or more blocks at an oldest block height in the cache.

17. The apparatus of claim 15, wherein the first request is indicative of a block height that is not stored in the cache, and the one or more processors are individually or collectively further operable to execute the code to cause the apparatus to:
obtain from the first external blockchain data service, a third block of blockchain transaction data at the indicated block height on the blockchain network;
obtain, from the second external blockchain data service, a fourth block of blockchain transaction data at the indicated block height on the blockchain network;
determine whether the third block is consistent with the fourth block; and
return a response to the first request based at least in part on determining whether the third block is consistent with the fourth block.

18. The apparatus of claim 15, wherein the one or more processors are individually or collectively further operable to execute the code to cause the apparatus to:
obtain a third block of blockchain transaction data at second block height subsequent to the first block height and wherein the third block of blockchain transaction data is subsequent to the first block of blockchain transaction data; and
update one or more tables associated with the cache to indicate that the third block is associated with a canonical chain on the blockchain network.

19. The apparatus of claim 18, wherein the one or more processors are individually or collectively further operable to execute the code to cause the apparatus to:
update the one or more tables associated with the cache to indicate that at least the first block that is prior to the third block is associated with the canonical chain on the blockchain network.

20. A non-transitory computer-readable medium storing code for data processing, the code comprising instructions executable by one or more processors to:
receive, from a first client application and at a computing system that hosts a plurality of worker nodes, a first request to interact with a blockchain network, wherein the computing system is configured to interact with a plurality of compute clusters and wherein each compute cluster of the plurality of compute clusters executes a set of blockchain nodes for supporting the blockchain network;
assign to the first client application in response to receiving the first request, a cookie;

route, using a worker node of the plurality of worker nodes and based at least in part on one or more routing factors, the first request to a first compute cluster of the plurality of compute clusters, the routed first request comprising the assigned cookie;

receive, from the first client application, a second request to interact with the blockchain network; and route, based at least in part on the cookie assigned to the first client application, the second request to the first compute cluster, wherein the first compute cluster is configured to route the second request to a blockchain node executed by the first compute cluster in accordance with the cookie assigned to the first client application.

* * * * *